US012561361B1

(12) United States Patent
Gassner et al.

(10) Patent No.: US 12,561,361 B1
(45) Date of Patent: Feb. 24, 2026

(54) SYSTEMS AND METHODS FOR GENERATING METADATA AND STORING THE METADATA IN A REPOSITORY

(71) Applicant: Veeva Systems Inc., Pleasanton, CA (US)

(72) Inventors: Peter Gassner, Pleasanton, CA (US); Andrew Han, Needham, MA (US); Bobby Ng, Danville, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/098,941

(22) Filed: Apr. 2, 2025

(51) Int. Cl.
  *G06F 16/00* (2019.01)
  *G06F 3/0482* (2013.01)
  *G06F 16/383* (2019.01)
(52) U.S. Cl.
  CPC .......... *G06F 16/383* (2019.01); *G06F 3/0482* (2013.01)
(58) Field of Classification Search
  CPC ............................... G06F 16/383; G06F 16/00
  See application file for complete search history.

(56) References Cited

U.S. PATENT DOCUMENTS

| | | | |
|---|---|---|---|
| 12,106,081 B1 | 10/2024 | McMillan et al. | |
| 2006/0074915 A1* | 4/2006 | Bhandarkar | G06Q 10/10 |
| | | | 707/999.009 |
| 2009/0063450 A1* | 3/2009 | Petri | G06F 16/958 |
| | | | 707/999.005 |
| 2018/0039527 A1 | 2/2018 | Gassner et al. | |

* cited by examiner

*Primary Examiner* — Cheryl Lewis

(57) ABSTRACT

A method for generating and storing a metadata representation includes receiving a first rule associated with a data object and including a trigger action, a rule criteria, a first rule outcome action associated with the rule criteria being fulfilled, and a second rule outcome action associated with the rule criteria not being fulfilled. The method includes generating and storing the metadata representation. The method further includes receiving a request to execute an action on the data object. The method includes selecting, in response to the trigger action matching the action of the request, the metadata representation from the first repository. The method includes extracting the rule from the metadata representation. The method includes executing the action on the data object. The method includes determining the rule criteria is fulfilled. The method includes executing, in response to the rule criteria being fulfilled, the first rule outcome action.

20 Claims, 12 Drawing Sheets

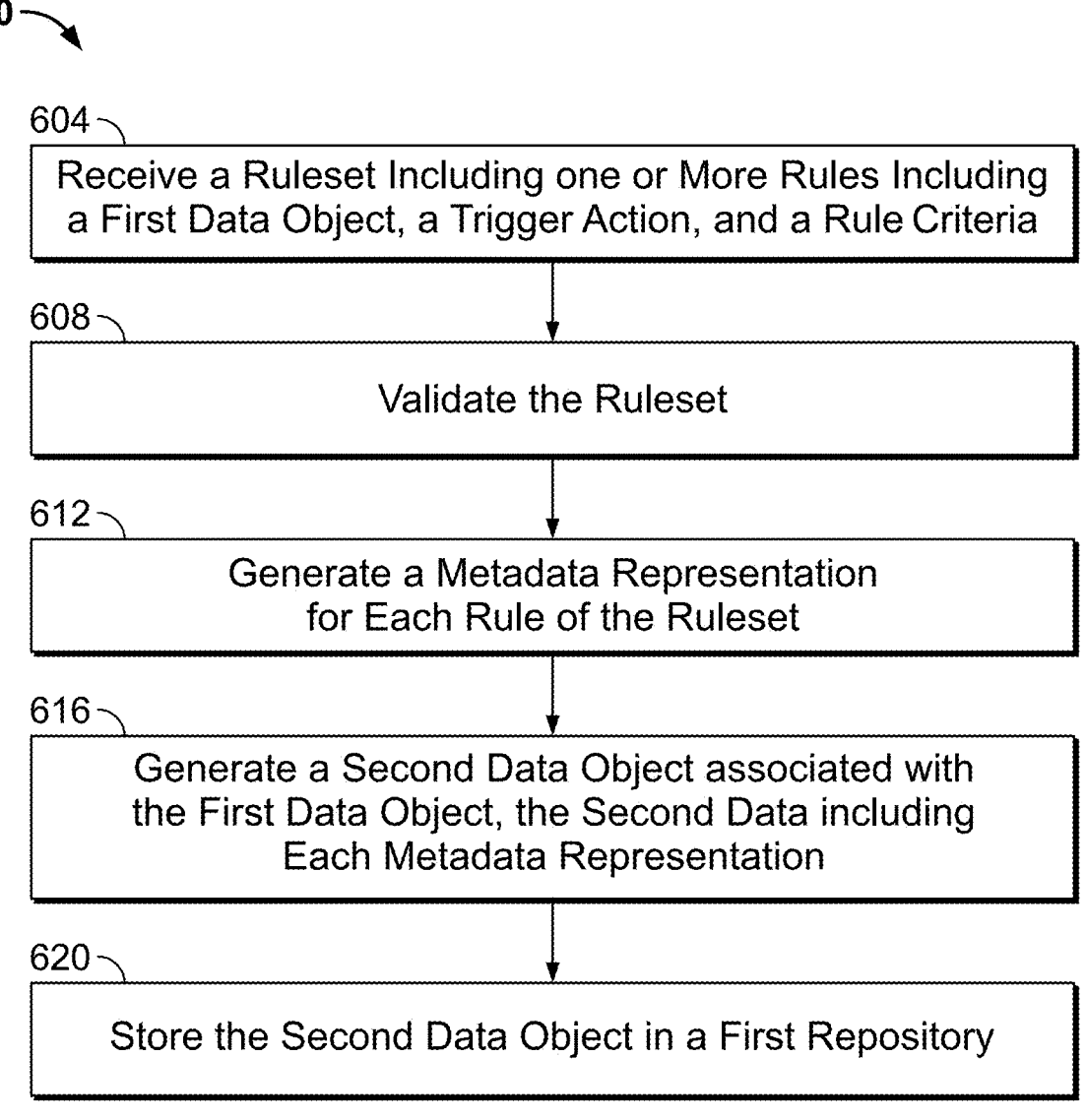

600

604
Receive a Ruleset Including one or More Rules Including a First Data Object, a Trigger Action, and a Rule Criteria 608
Validate the Ruleset 612
Generate a Metadata Representation for Each Rule of the Ruleset 616
Generate a Second Data Object associated with the First Data Object, the Second Data including Each Metadata Representation 620
Store the Second Data Object in a First Repository

FIG. 6

```
1.  RECREATE Actiontrigger new_inquiry_responses__c (
2.      label ('New Inquiry Response'),
3.      active (true),
4.      description ('Update Response Date for USA/CA'),
5.      object ('medical_inquiry__y'),
6.      event ('create'),
7.      order (1),
8.      Actionblock new_inquiry_responses__c (
9.          label ('New CA USA Inquiry'),
10.         description (''),
11.         if_then_else ('
12.             If
13.                 (country__y= "USA" && state__y="CA")
14.             Then {
15.                 UpdateCurrentRecord (
16.                     response_dates__c = "07/07/25",
17.                     urgent__c = If (response date__c<Today (), true, false)
18.                 ),
19.                 SendNotification (account__vr, lead__y, us_inquiry_template__c)
20.             }
21.             ELSE
22.                 SendNotification (account__vr, lead__y, non_us_inquiry_template__c)
23.         ')
24.     );
```

SYSTEMS AND METHODS FOR GENERATING METADATA AND STORING THE METADATA IN A REPOSITORY

TECHNICAL FIELD

The present disclosure relates to systems and methods for generating metadata and storing the metadata in a repository.

BACKGROUND

Researchers, scientists, industry players, academics, government regulators, and other stakeholders are increasingly in need of efficient and simple ways to generate and store metadata.

SUMMARY

One embodiment relates to a method for generating a metadata representation and storing the metadata representation in a repository. The method includes receiving a first rule associated with a data object and including a trigger action, a rule criteria, a first rule outcome action associated with the rule criteria being fulfilled, and a second rule outcome action associated with the rule criteria not being fulfilled. The method further includes generating the metadata representation based on the first rule. The method further includes storing the metadata representation in the repository. The method further includes receiving a request to execute an action on the data object. The action is at least one of a create action, an update action, and a delete action. The method further includes selecting, in response to the trigger action matching the action of the request, the metadata representation from the first repository. The method further includes extracting the rule from the metadata representation. The method further includes executing the action on the data object. The method further includes determining the rule criteria is fulfilled. The method further includes executing, in response to the rule criteria being fulfilled, the first rule outcome action.

In some embodiments, the rule criteria is a first rule criteria, and the method further includes receiving a second rule associated with the data object and including the trigger action, a second rule criteria, and a third rule outcome action. In some embodiments, the metadata representation is generated based on the first rule and the second rule. In some embodiments, the method further includes extracting the second rule from the metadata representation. In some embodiments, the method further includes determining the second rule criteria is fulfilled. In some embodiments, the method further includes executing, in response to the second rule criteria being fulfilled, the third rule outcome action. In some embodiments, the action is executed on the data object after the third rule outcome action is executed.

In some embodiments, the rule criteria is a first rule criteria, the first rule includes a first ranking, and the method further includes receiving a second rule associated with the data object and including the trigger action, a second rule criteria, a third rule outcome action, and a second ranking. In some embodiments, the metadata representation is generated based on the first rule and the second rule. In some embodiments, the method further includes extracting the second rule from the metadata representation. In some embodiments, the method further includes determining the second rule criteria is fulfilled. In some embodiments, the method further includes executing, in response to the second rule criteria being fulfilled, the third rule outcome action. In some embodiments the first rule outcome action is executed before the third rule outcome action based on the first ranking being a higher rank than the second ranking.

In some embodiments, the method further includes outputting an empty rule to a client computing device to enable display on a user interface. In some embodiments, the user interface includes a rule representation including an IF statement field, a THEN statement field, and an ELSE statement field. In some embodiments, the rule criteria is received via the IF statement field. Ins some embodiments, the first rule outcome action associated with the rule criteria being fulfilled is received via the THEN statement field. In some embodiments, the second rule outcome action associated with the rule criteria not being fulfilled is received via the ELSE statement field.

In some embodiments, the data object includes at least one data field. In some embodiments, in response to a selection of the IF statement field, the user interface includes an option menu including the at least one data field of the data object.

In some embodiments, the data object includes multiple data fields. In some embodiments, in response to a selection of the IF statement field, the user interface includes an option menu including the multiple data fields of the data object. In some embodiments, the method further includes determining, by the content management server and in response to a selection of at least one data field of the multiple data fields, a type of the selected data field. In some embodiments, in response to a selection of at least one data field of the multiple data fields included in the option menu, the user interface includes an expression or operator menu including one or more operators associated with the type of the selected data field. In some embodiments, in response to the type of the selected data field being a string or text, the expression menu includes an equal operator, a not equal operator, an and operator, and an or operator. In some embodiments, in response to the type of the selected data field being a number, the expression menu includes an equal operator, a not equal operator, a greater than operator, a greater than or equal to operator, a less than operator, and a less than or equal to operator.

In some embodiments, the data object is a first data object. In some embodiments, the method further includes generating a second data object depending from the first data object and including the metadata representation. In some embodiments, the second data object is stored in the repository.

In some embodiments, the metadata representation is a metadata definition language (MDL) that includes at least one of a: a create command, a recreate command, a rename command, an alter command, or a drop command.

Another embodiment relates to a content management system including a repository and a content management server. The content management server is configured to: receive a first rule associated with a data object and including a trigger action, a rule criteria, a first rule outcome action associated with the rule criteria being fulfilled, and a second rule outcome action associated with the rule criteria not being fulfilled; generate the metadata representation based on the first rule; store the metadata representation in the repository; and receive a request to execute an action on the data object. The action is at least one of a create action, an update action, and a delete action. The content management servers is further configured to: select, in response to the trigger action matching the action of the request, the metadata representation from the first repository; extract the rule from the metadata representation; execute the action on the data object; determine the rule criteria is not fulfilled; and execute in response to the rule criteria not being fulfilled, the second rule outcome action.

In some embodiments, the rule criteria is a first rule criteria. In some embodiments, the content management server is further configured to receive a second rule associated with the data object and including the trigger action, a second rule criteria, and a third rule outcome action. In some embodiments, the metadata representation is generated based on the first rule and the second rule. In some embodiments, the content management server is further configured to extract the second rule from the metadata representation; determine the second rule criteria is fulfilled; and execute, in response to the second rule criteria being fulfilled, the third rule outcome action. In some embodiments, the action is executed on the data object after the third rule outcome action is executed.

In some embodiments, the rule criteria is a first rule criteria. In some embodiments, the first rule includes a first ranking. In some embodiments, the content management server is further configured to receive a second rule associated with the data object and including the trigger action, a second rule criteria, a third rule outcome action, and a second ranking. In some embodiments, the metadata representation is generated based on the first rule and the second rule; extract the second rule from the metadata representation; determine the second rule criteria is fulfilled; and execute, in response to the second rule criteria being fulfilled, the third rule outcome action. In some embodiments, the second rule outcome action is executed before the third rule outcome action based on the first ranking being a higher rank than the second ranking.

In some embodiments, the content management server is further configured to output an empty rule to a client computing device to enable display on a user interface. In some embodiments, the user interface includes a rule representation including an IF statement field, a THEN statement field, and an ELSE statement field. In some embodiments, the rule criteria is received via the IF statement field. Ins some embodiments, the first rule outcome action associated with the rule criteria being fulfilled is received via the THEN statement field. In some embodiments, the second rule outcome action associated with the rule criteria not being fulfilled is received via the ELSE statement field.

In some embodiments, the data object includes at least one data field. In some embodiments, in response to a selection of the IF statement field, the user interface includes an option menu including the at least one data field of the data object.

In some embodiments, the data object includes multiple data fields. In some embodiments, in response to a selection of the IF statement field, the user interface includes an option menu including the multiple data fields of the data object. In some embodiments, the content management server is further configured to includes determine, in response to a selection of at least one data field of the multiple data fields, a type of the selected data field. In some embodiments, in response to a selection of at least one data field of the multiple data fields included in the option menu, the user interface includes an expression or operator menu including one or more operators associated with the type of the selected data field. In some embodiments, in response to the type of the selected data field being a string or text, the expression menu includes an equal operator, a not equal operator, an and operator, and an or operator. In some embodiments, in response to the type of the selected data field being a number, the expression menu includes an equal operator, a not equal operator, a greater than operator, a greater than or equal to operator, a less than operator, and a less than or equal to operator.

In some embodiments, the data object is a first data object. In some embodiments, the content management server is further configured to generate a second data object depending from the first data object and including the metadata representation. In some embodiments, the second data object is stored in the repository.

In some embodiments, the metadata representation is a metadata definition language (MDL) that includes at least one of a: a create command, a recreate command, a rename command, an alter command, or a drop command.

Another embodiments relates to a method for generating at least one metadata representation and storing the at least one metadata representation in a repository. The method includes receiving a first rule associated with a data object and including a trigger action, a first rule criteria, and a first rule outcome action. The method further includes receiving a second rule associated with the data object and including the trigger action, a second rule criteria, and a second rule outcome action. The method further includes generating the at least one metadata representation based on at least one of the first rule or the second rule. The method further includes storing the at least one metadata representation in the repository. The method further includes receiving a request to execute an action on the data object. The action is at least one of a create action, an update action, and a delete action. The method further includes selecting, in response to the trigger action matching the action of the request, the at least one metadata representation from the first repository. The method further includes extracting the first rule from the at least one metadata representation. The method further includes extracting the second rule from the at least one metadata representation. The method further includes determining the first rule criteria is fulfilled. The method further includes executing, in response to the first rule criteria being fulfilled, the first rule outcome action. The method further includes executing, after executing the first rule outcome action, the action on the data object. The method further includes determining, in response to executing the action on the data object, the second rule criteria is fulfilled. The method further includes executing, by the content management server and in response to the second rule criteria being fulfilled, the second rule outcome action.

In some embodiments, the first rule outcome action is associated with the first rule criteria being fulfilled. In some embodiments, the first rule includes a third rule outcome action associated with the first rule criteria not being fulfilled.

In some embodiments, the method further includes outputting an empty rule to a client computing device to enable display on a user interface. In some embodiments, the user interface includes a rule representation including an IF statement field, a THEN statement field, and an ELSE statement field. In some embodiments, the rule criteria is received via the IF statement field. Ins some embodiments, the first rule outcome action associated with the rule criteria being fulfilled is received via the THEN statement field. In some embodiments, the second rule outcome action associated with the rule criteria not being fulfilled is received via the ELSE statement field.

In some embodiments, the data object includes at least one data field. In some embodiments, in response to a selection of the IF statement field, the user interface includes an option menu including the at least one data field of the data object.

In some embodiments, the data object includes multiple data fields. In some embodiments, in response to a selection of the IF statement field, the user interface includes an option menu including the multiple data fields of the data object. In some embodiments, the method further includes determining, by the content management server and in response to a selection of at least one data field of the multiple data fields, a type of the selected data field. In some embodiments, in response to a selection of at least one data field of the multiple data fields included in the option menu, the user interface includes an expression or operator menu including one or more operators associated with the type of the selected data field. In some embodiments, in response to the type of the selected data field being a string or text, the expression menu includes an equal operator, a not equal operator, an and operator, and an or operator. In some embodiments, in response to the type of the selected data field being a number, the expression menu includes an equal operator, a not equal operator, a greater than operator, a greater than or equal to operator, a less than operator, and a less than or equal to operator.

In some embodiments, the data object is a first data object. In some embodiments, the method further includes generating a second data object depending from the first data object and including the metadata representation. In some embodiments, the second data object is stored in the repository.

In some embodiments, the metadata representation is a metadata definition language (MDL) that includes at least one of a: a create command, a recreate command, a rename command, an alter command, or a drop command.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 6 is a flow diagram of a method for generating a metadata representation for a rule, according to an example embodiment.

FIG. 10 is an example metadata representation file including a rule.

DETAILED DESCRIPTION

Figure 1:
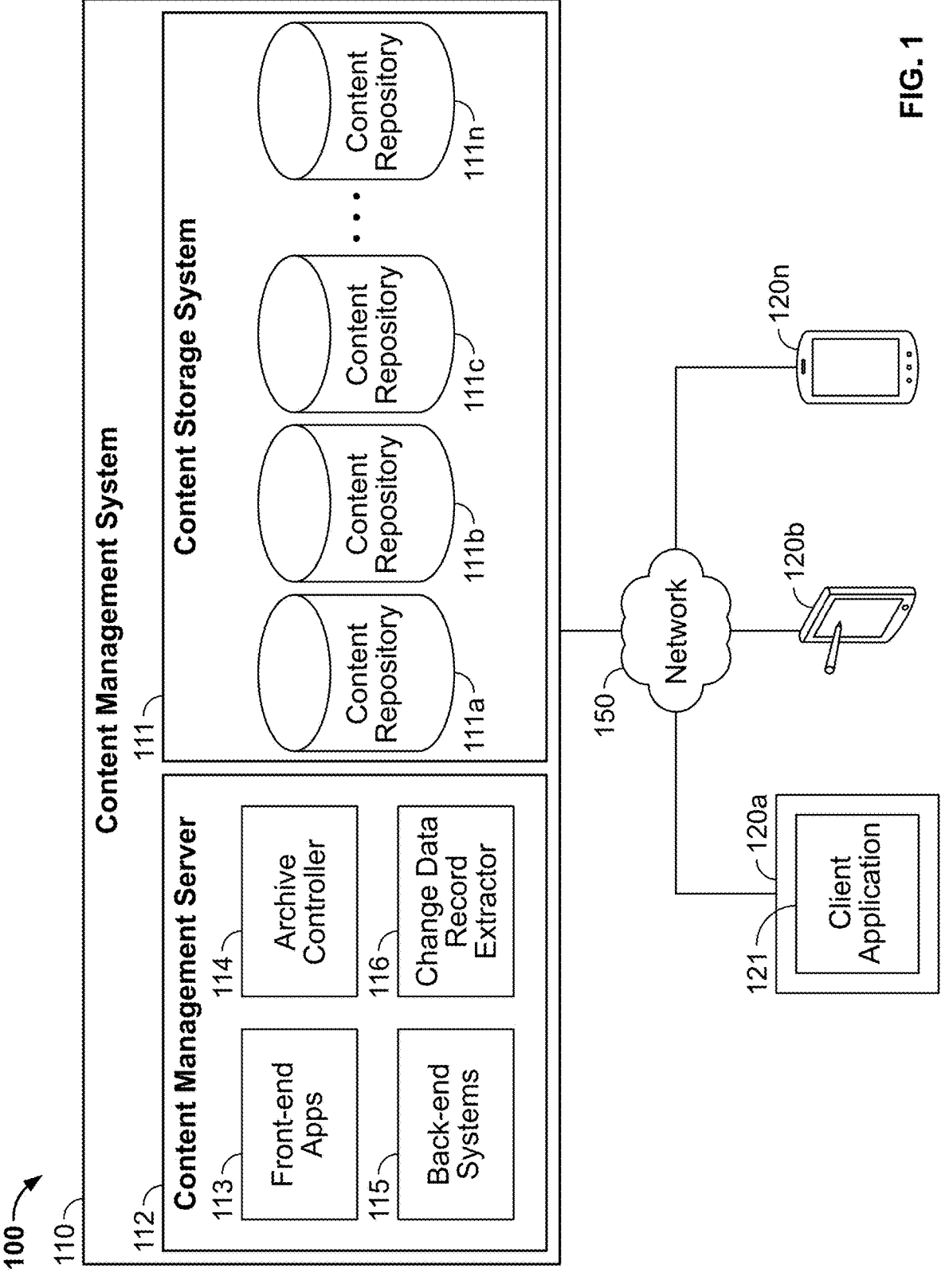
FIG. 1 illustrates an example high level block diagram of an enterprise content management architecture, according to an example embodiment.

Referring generally to the figures, systems and methods for generating and storing a metadata representation of a rule are disclosed. The systems and methods described herein provide an improved rule execution system that utilizes metadata representations to store and evaluate rules at runtime. In operation, the present systems and methods may receive rules associated with a data object and a specific CRUD action, and then generate a metadata representation based on the rule. The metadata representation may then be stored in a repository until the present systems and methods receive a request to perform the specific action on the data object. In response, the present systems and methods may retrieve the metadata representation and extract the rule. The rule may then be evaluated, prior to or after the action is executed.

By utilizing metadata representations to store and extract the rule(s), the present systems and methods provide for dynamic updates and improved flexibility in executing the rules and an overall technical improvement to rule-based systems. For instance, metadata can be modified without altering the core application code. This allows rules to be updated, added, or removed without requiring system redeployment or downtime. For instance, in traditional systems, rules are often hardcoded directly into the application's source code. Any change to these rules, whether to correct an error, implement a new business policy, or optimize performance, requires a full development cycle. In comparison, storing the rules in metadata decouples the rules from the application code. The application uses a rule engine to fetch and execute the rules from the metadata store at run-time. This enables dynamic rules in which rules can be changed directly in the metadata store without requiring application downtime. By doing so, updating rules becomes a data management task rather than a software development task. In that regard, by utilizing metadata representations to store and extract the rule(s), the present systems and methods require less processing power and memory to by not generating an entirely new set of application code, and overall simplify the runtime rule process.

Additionally, by providing for dynamic evaluation and execution of the rules in relation to the trigger action (i.e., allowing the user to specify if the rule is evaluated before or after the action is executed), the present systems and methods provide for an improved rule handling and execution, and thereby provide a technical improvement to rule-based programming. For instance, by allowing the user to specify when the rule is to be evaluated and executed, the present systems and methods allow for the system to perform the action at a precise time and modify data when needed. For instance, if the action is a delete action, the user may specify a rule that executes prior to the delete action, in which portions of the data object are stored for later evaluation or use in other systems. In comparison, if the action is an update action, the user may specify a rule, that executes after the update action, that sends out a notification that a specific data object or field thereof was updated. Accordingly, by providing for dynamic execution of the rules, the present systems and methods provide for rules that execute when they are needed to, thereby providing greater precision, efficiency, flexibility, and control in rule-based programming. For instance, by executing rules only when triggered by a specific action, the system avoids unnecessary rule evaluations. This leads to more efficient resource utilization and improved performance.

Moreover, by providing for click through generation of the IF/THEN/ELSE statements to generate the rules and by utilizing option menus that are generated based on already entered values, the present systems and methods take a complicated experience that often requires a degree (e.g., programming) and create a rule generation system which requires little skill, thereby reducing errors and providing for improved rule generation. For instance, because the systems and methods described herein generate menus including fields which correspond to the data object associated with the rules, the user can better determine and access the fields they may want to utilize when generating rules providing for less error in the rule-building process, and thereby saving on processing power and memory by requiring less iterations in rule development. Likewise, by displaying operators that correspond to the type of the field (e.g., number, string, etc.), the present systems and methods again provide for less error in the rule-building process, thereby saving on processing power and memory by requiring less validations (e.g., by not having validations come back with failed indications) overall.

Referring now to FIG. 1 an enterprise content management system 100 is shown, according to an example embodiment. The enterprise may be a business, an organization, or the like. As shown, the system 100 may include a content management system 110, and a plurality of client computing devices 120a, 120b, . . . 120n, coupled to each other via a network 150. The content management system 110 may include a content storage system 111 and a content management server 112. The content storage system 111 may have two or more content repositories, e.g., 111a, 111b, 111c . . . and 111n.

The network 150 communicably and operably couples the content management system 110 and the client computing devices 120a-120n such that communicable and operable computing may be provided between the content management system 110 and the client computing devices 120a-120n over the network 150. In various embodiments, the network 150 includes any combination of a local area network (LAN), an intranet, the Internet, or any other suitable communications network, directly or through another interface.

The client computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a client computing device, e.g., 120a, and access content in the content management system 110 via the network 150. In some embodiments each client computing device 120a-120n may include a network interface (not shown to communicate with the network) and a processing circuit (not shown) to process data (e.g., data records, change data records) and/or generate requests. The client computing devices 120a-120n are illustrated in more detail in FIG. 4.

The content storage system 111 may store content that client applications (e.g., 121) in client computing devices 120a-120n may access and may be any commercially available storage devices. Each content repository (e.g., 111a, 111b, 111c or 111n) may store content, including data records, change data records, an archive index file, and the like. Data records may be stored in the content repositories 111a-111n, but each tenant's data may be segregated from other tenants' data in the content storage system 111 by being stored in a separate content repository. In some embodiments, each content repository 111a-111n may include multiple additional repositories (see FIG. 6). In this regard, each content repository 111a-111n may be a group or set of repositories associated with a specific customer or tenant.

The content management server 112 is typically a remote computer system accessible over a remote or local network, such as the network 150. The content management server 112 could be any commercially available computing devices. A client application (e.g., 121) process may be active on one or more client computing devices 120a-120n. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In some embodiments, the content management server 112 may include a rule management controller 114 which may receive, store, and manage rulesets including multiple rules. For instance, the rule management controller may receive a ruleset associated with a specific data object and a specific trigger action (e.g., create, update/modify, and delete/remove) from one of the client computing devices (e.g., 120a). The ruleset may include multiple rules, and each rule may include the specific trigger action, the specific data object, a specific rule outcome action, and a specific rule criteria, as will be discussed further herein. The rule management controller 114 may then determine, at runtime, if the rule is applicable and execute the rule outcome action. In some embodiments, the rule management controller 114 may generate metadata definition language (MDL) representing each specific rule of the ruleset.

MDL may be similar to Data Definition Language (DDL) in databases, and provide runtime actions to create, describe (read), update, and drop (delete) components of one of the content repositories 111a-n make up its configuration. In that regard, MDL is a tool for manipulating data records programmatically. For instance, MDL uses CRUD-like commands to manage data records of the content management system 110. Based on MDL commands, the content management system 112 may use CREATE, RECREATE, RENAME, ALTER, and DROP commands to manage data records of the content management system 110, which are described in detail in U.S. patent application Ser. No. 15/228,968, and U.S. Pat. No. 12,106,081, which are hereby incorporated by reference in their entirety.

Additionally, the content management server 112 may include a metadata extractor 116, which may retrieve the MDL representing a rule (i.e., the metadata representation) at runtime and generate tenant code representing the rule. For instance, the metadata extractor 116 may receive the MDL and determine the portions of the MDL representing the rule(s). The metadata extractor 116 may then generate tenant code for execution by the content management server 112 at runtime. FIG. 10 shows an example of MDL 1000 including a rule therein. In some embodiments, the change data extractor 116 may generate the MDL based on the rule. In other embodiments, the content management server 112 may include a metadata generator (not shown) that may generate the MDL based on the rule.

Although the front-end applications 113, the back-end systems 115, the rule management controller 114, and the metadata extractor 116, are shown in one server, it should be understood that they may be implemented in multiple computing devices (e.g., multiple servers for each, a single server for the for each front-end application 113, a single server for each back-end system 115, a server for the rule management controller 114, etc.).

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
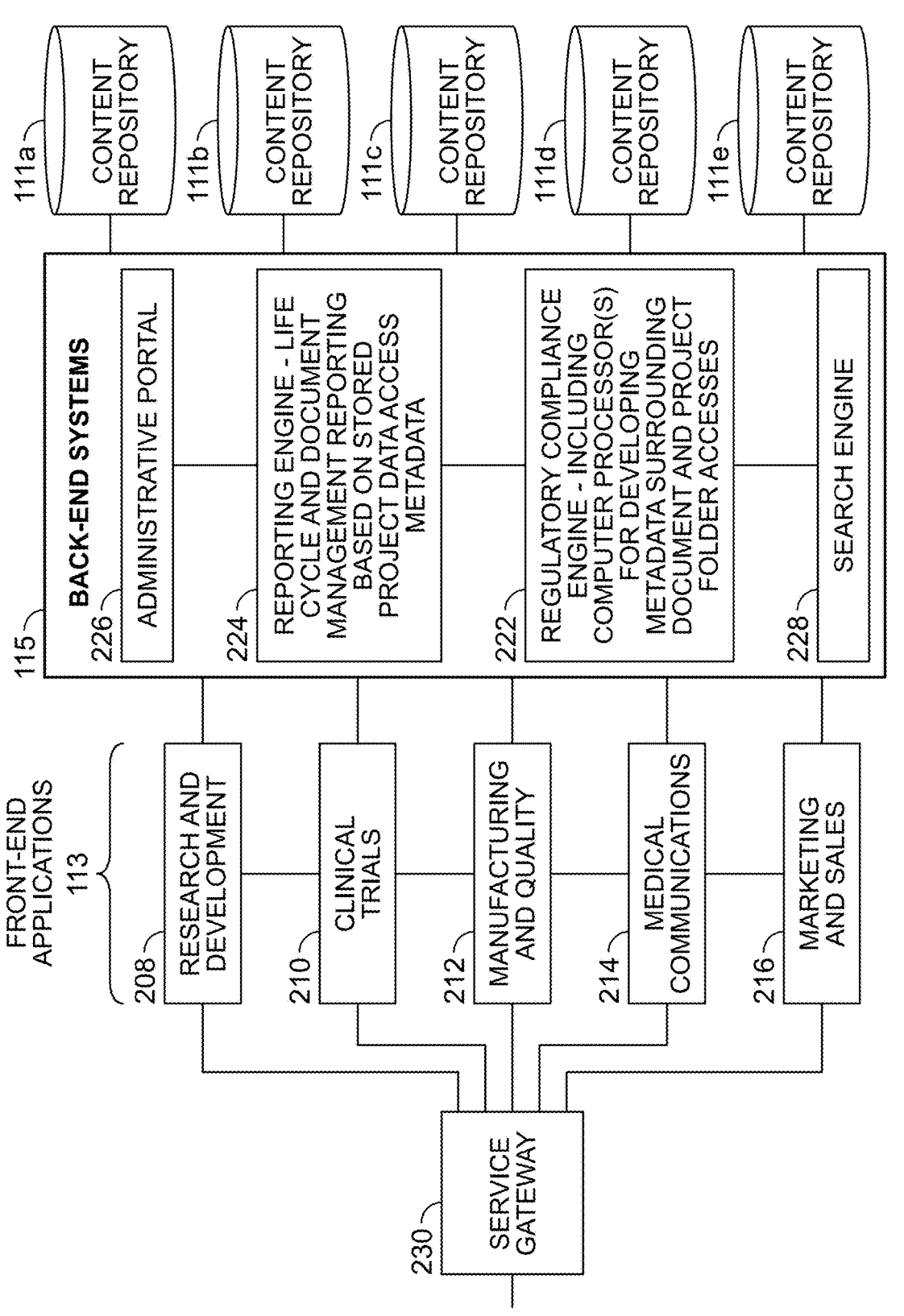
FIG. 2 provides a description of the content management system with additional specific applications and interfaces connected thereto, according to an example embodiment.

FIG. 2 provides a description of the content storage system 111 with additional specific applications and interfaces connected thereto, according to an example embodiment. In an embodiment, this content storage system 111 is a cloud-based or distributed network-based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111*a*. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111*c*, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111*d*.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111*e*.

In some embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In some embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In some embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In some embodiments, the back-end systems 115 may include a search engine 228 whereby the content management system 110 can deliver simple, relevant and secure searching.

In some embodiments, the content management system 110 may include more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back-end systems 115, enabling seamless integration among complementary systems.

In the context of the described embodiments, content in one repository, e.g., the content repository 111a for the Research & Development (R&D) front-end application 208, may be re-used in another repository (e.g., the content repository 111d) with another front-end application (e.g., the medical communications application 214).

In some embodiments, the content management system 110 may store content for other industries.

Figure 3:
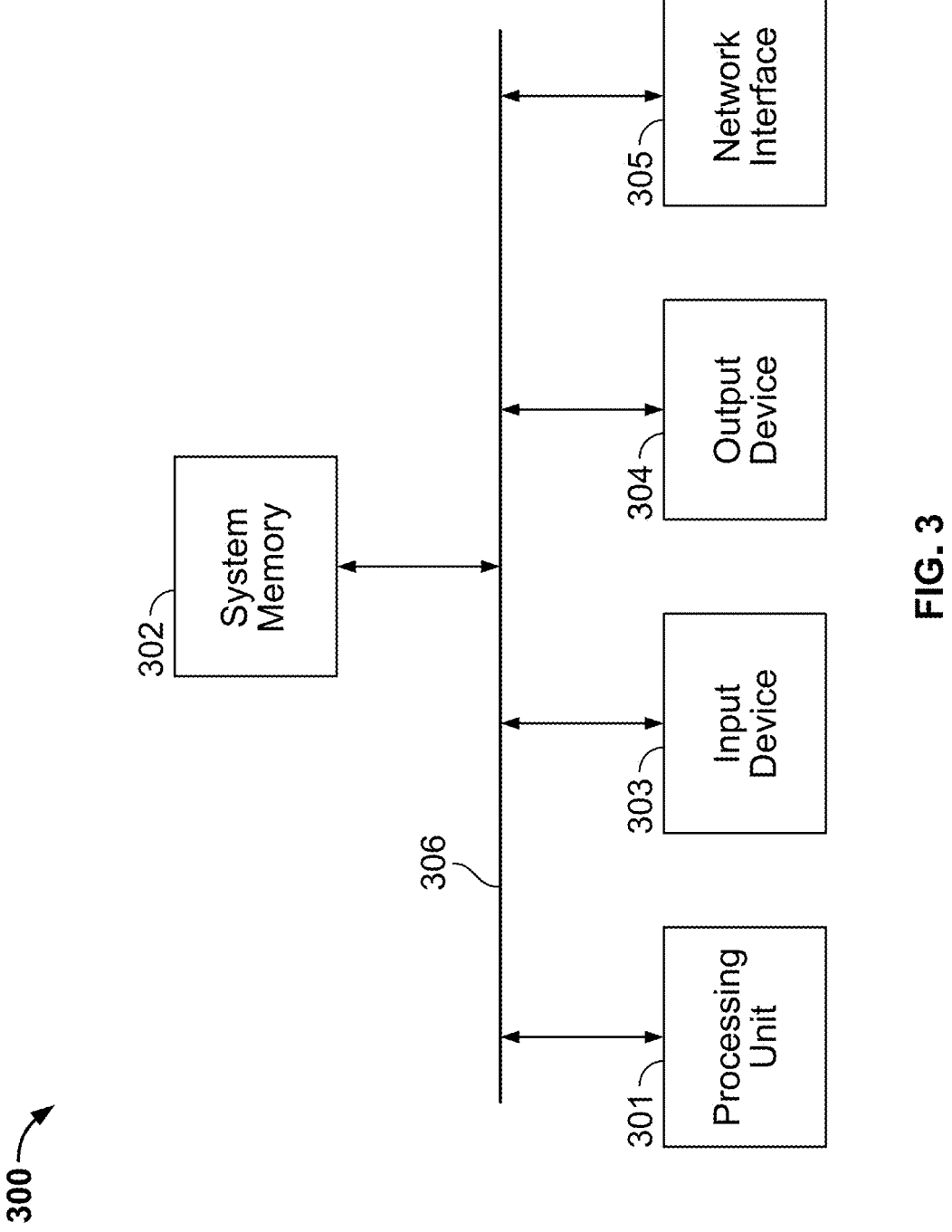
FIG. 3 illustrates an example block diagram of a computing device, according to an example embodiment.

FIG. 3 illustrates an example block diagram of a computing device 300 which can be used as the client computing devices 120a-120n, and the content management server 112 in FIG. 1, according to an example embodiment. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. In some embodiments, the processing unit 301 may be implemented as a general-purpose processor, an application specific integrated circuit (ASIC), one or more field programmable gate array (FPGAs), a digital signal processor (DSP), a group of processing components or other suitable electronic processing components.

The system memory 302 typically includes a variety of computer readable media which may be any available media accessible by the processing unit 301. For instance, the system memory 302 may include one or more memory devices (e.g., RAM, NVRAM, ROM, flash memory, hard disk storage, etc.) that store data and/or computer code for facilitating the various processes described herein. That is, in operation and use, the system memory 302 stores at least portions of instructions and data for execution by the processing unit 301. The system memory 302 may be or include tangible, non-transient volatile memory and/or non-volatile memory.

A user can enter commands and information to the computing device 300 through the input device 303. The input device 303 may be, e.g., a keyboard, a touchscreen input device, a touch pad, a mouse, an RFID scanner, a sensor, a microphone, and/or a pen.

The computing device 300 may provide its output via the output device 304 which may be, e.g., a monitor or other type of display device, an RFID scanner, a sensor, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may include program logic and/or hardware-based components that connect the computing device 300 to the network 150. For example, the network interface 305 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 305 includes the hardware and machine-readable media structured to support communication over multiple channels of data communication (e.g., wireless, Bluetooth, near-field communication (NFC). In some embodiments, the network interface 305 includes cryptography logic and capabilities to establish a secure communications session.

Figure 4:
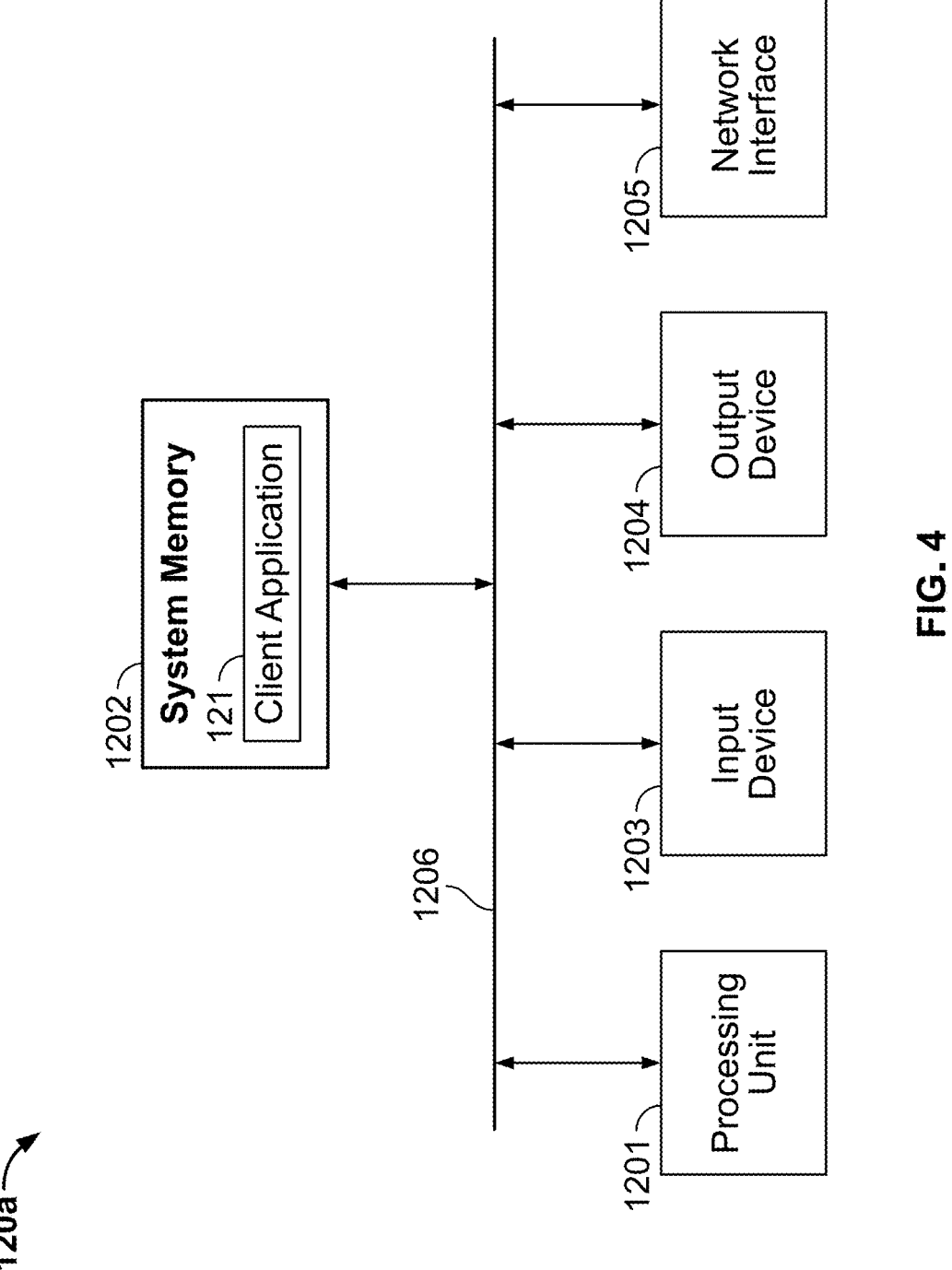
FIG. 4 illustrates an example high level block diagram of a client computing device, according to an example embodiment.

FIG. 4 illustrates an example high level block diagram of a client computing device (e.g., 120a) according to an example embodiment. The client computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
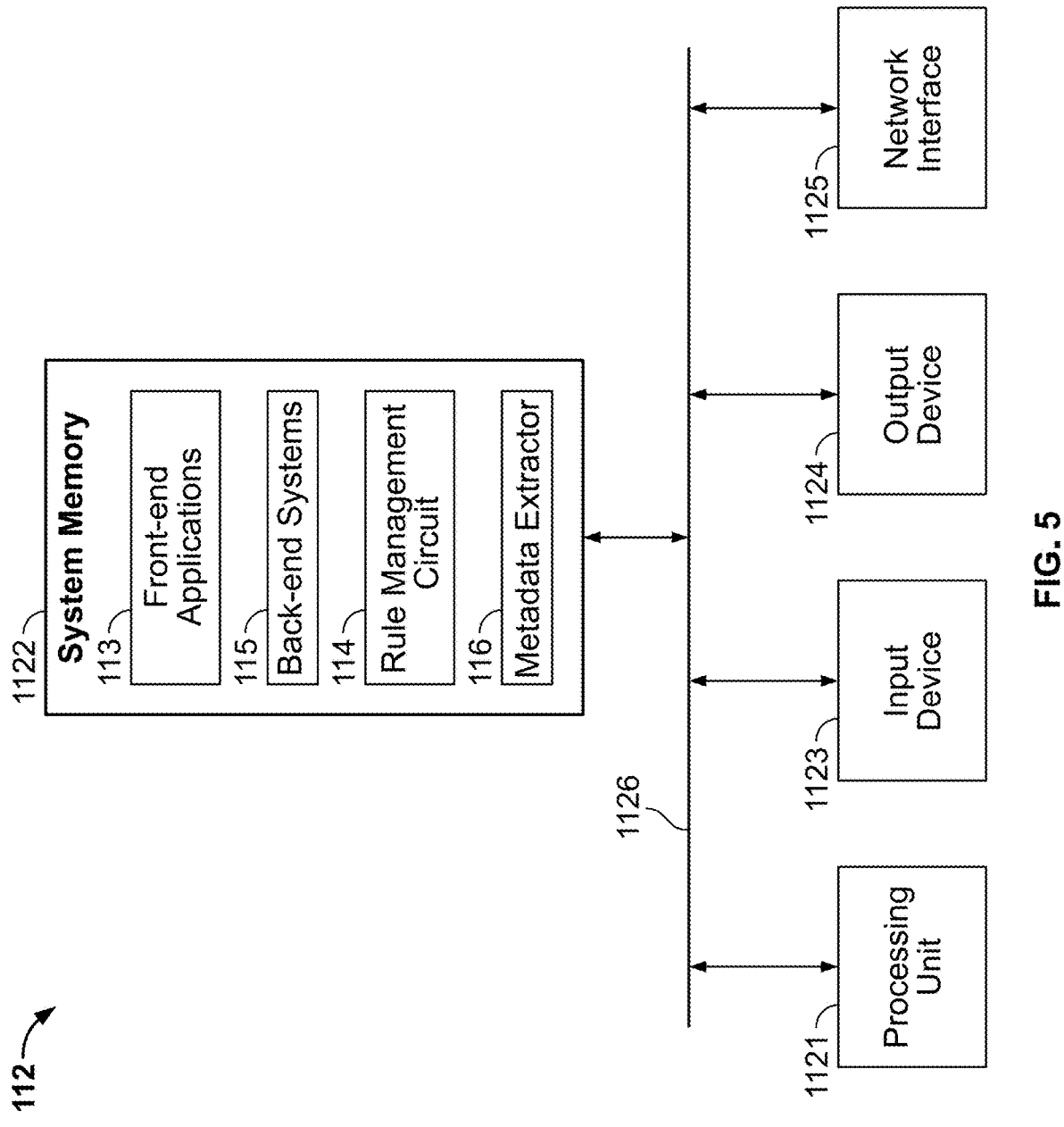
FIG. 5 illustrates an example high level block diagram of the content management server, according to an example embodiment.

FIG. 5 illustrates an example high level block diagram of the content management server 112 according to an example embodiment. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, the archive controller 114, and the change data extractor 116.

Referring now to FIG. 6, a method 600 of generating a metadata representation of at least one rule is shown, according to an example embodiment. Method 600 can be carried out by the system of FIG. 1. More particularly, the method 600 can be carried out by the content management server 112.

Method 600 commences at step 604 at which the content management server 112 receives a ruleset including multiple rules. In some embodiments, the rules may be received from one of the client computing devices (e.g., 120a) via a user interface (e.g., see FIG. 8). In some embodiments, before step 604, the content management server 112 may receive the ruleset, and then at step 604, the content management server 112 may receive a rule identifying the ruleset. The ruleset may be associated with a specific data object and a trigger action (e.g., create, modify/update, and/or delete/remove, see FIG. 8). Likewise, each rule of the ruleset may include the specific object, the specific trigger action, and a rule criteria (see IF statement 940 of FIGS. 9A-9C), a rule outcome action (see Then statement 942 or else statement 944 of FIG. 9A-9C).

In some embodiments, each rule may further include a rank or order value, which defines the order in which the rules of the ruleset are executed. For instance, a rule including the rank of "1" may be executed before a rule including the rank "2", which may be executed before a rule including the rank "3," and so on. In some embodiments, the ruleset may only include up to a threshold number of rules (e.g., e.g., inclusively between 5-10 rules, 5 rules, 10 rules, 20 rules, 50 rules etc.). Accordingly, if a user tries to add an additional rule beyond the threshold number, the content management server 112 may output a notification that no additional rules can be added.

By providing for up to 50 rules in a single ruleset for a specific action and data object, the present systems and methods provide a runtime rule evaluation methodology that enables a reliable and consistent runtime environment. For instance, if a single node could include a large number of rules (e.g., 100 rules, 1000 rules, etc.), the evaluation of the rules would consume a lot of processing power and memory, thereby disrupting the other functions of the system (e.g., modifying data records, etc.). Likewise, if a single ruleset could only include a small number of data records (e.g., 10 rules, 5 rules, etc.), the user could only evaluate a few rules at runtime, thereby providing for little to any affect of the rules. In that regard, the value of 50 rules provides a technical improvement to rule-based systems, by providing for a runtime rule evaluation methodology that enables a reliable and consistent runtime environment.

Once the content management server 112 has received the ruleset, the method 600 may proceed to step 608 at which the content management server 112 validates the ruleset. In some embodiments, if only a single rule was received at step 604, the content management server 112 may validate the single rule at step 608. To validate the ruleset, the content management server 112 may review the rule criteria and the rule criteria outcome action for errors (e.g., typographical errors, structural errors, syntax errors, etc.) and/or execute the expressions included in the rule criteria and the rule criteria to determine if the expressions are valid. For instance, the rule criteria may include the expression "response_date_c>" 08/15/2024"" Accordingly, the content management server 112 may determine the rule criteria is not valid due to the typographical error of not including the correct field name "response_date_c". In another example, the rule criteria may include the expression "response_date_c>"08/15/2024"&&". Accordingly, the content management server 112 may determine the rule criteria is not valid due to the syntax error of having no additional statement after "&&". In another example, the content management server 112 may not validate the rule in response to determining the rule includes no rule criteria outcome action (e.g., no values in the then statement 942 and/or the else statement 944).

Once the content management server 112 has validated the rule and/or ruleset, the method 600 proceeds to step 612 at which the content management server 112 generates a metadata representation (e.g., a set of MDL) for each rule of the ruleset. In some embodiments, the content management server 112 may generate a single metadata representation for the ruleset. To generate the metadata representation, the content management server 112 may clean and/or modify each rule of the validated ruleset. For instance, the content management server 112 may modify values of the rule from a first format (e.g., "UpdateCurrent Record(response_date_c=="07/09/25" . . . ) to a second format (e.g., see FIG. 10). In another example, the content management server 112 may add specific text to the rule, which are not shown in the user interface (e.g., "active (true)" object ('medical_inquriy_v')", etc.). Accordingly, at step 612, the content management server 112 may generate a metadata representation for each rule, modify each rule, and add the modified rule to the metadata representation. For instance, the content management server 112 may parse the rule and generate a portion of the metadata representation for each of the portions of the rule (e.g., a first portion of the metadata representation ("event ('create')" for the specific trigger action, a second portion of the metadata representation ("object ('medical_inqury')" for the specific object of the rule, a third portion of the metadata representation ("if_then_else('If( . . . )" for the rule criteria, a fourth portion of the metadata representation ("if_then_else(' . . . Then( . . . )Else ( . . . )" for the specific rule criteria outcome action, and the like.

Once the content management server 112 has generated the metadata representation for each rule of the ruleset, the method 600 proceeds to step 616 at which the content management server 112 generates a second data object associated with the first data object. The second data object may be a child data object of the first data object (i.e., a data object that is directly related to and dependent (i.e., requires the first object or record to exist before the child object can exist) the first data object). For instance, in the example shown in FIG. 8, the first data object may be a medical inquiry data object (e.g., medical_inquiry_c). Then, the second/child data object may be an action trigger data object (e.g., action_trigger__c), which is dependent on the medical inquiry data object. Accordingly, at step 616, the content management server 112 may generate the second data object based on the metadata representation(s). For instance, the second data object may include each metadata representation.

In some embodiments, the first data object may include a child (second) data object for each metadata representation (e.g., for each rule of the ruleset). In other embodiments, the first data object may include a child (second) data object for each ruleset, which may include a child (third) data object thereof for each metadata representation (e.g., for each rule of the ruleset). Accordingly, at step 616, the content management server 112 may generate the second data object and then generate a third data object for each metadata representation(s). In some embodiments, the first data object may include a child data for each action type described further herein (e.g., create, update/modify, and delete/remove). In that regard, the first data object may include a first child data object for the create action, a second child data object for the update action, and a third child data object for the delete action. Then, each child data object (the first-third child data objects) may include the metadata representation for the rules associated with the corresponding specific actions.

Once the content management server 112 has generated the second data object including the metadata representation(s), the method 600 proceeds to step 620 at which the content management server 112 may store the second data object in a repository (e.g., one of the content repositories 111*a-n*). In some embodiments, the second data object may be stored in the repository in association with the first data object (e.g., as a child data object thereof).

While the method 600 has been described with regard to a single specific data object and a single specific action, it should be understood that the method 600 may be repeated for each specific data object and for each specific action described further herein. For instance, the content management server 112 may proceed through the method 600 for a first data object (e.g., the medical inquiry data object) for each action (e.g., three times: once for create, once for modify, and once for delete). In that regard, the content management server 112 may receive three rulesets (one for each action), generate three child data objects (one for each action) associated with the first data object, and store the three child data objects in a repository. Likewise, the same process may be repeated for each specific data object of the content storage system 111.

Figure 7:
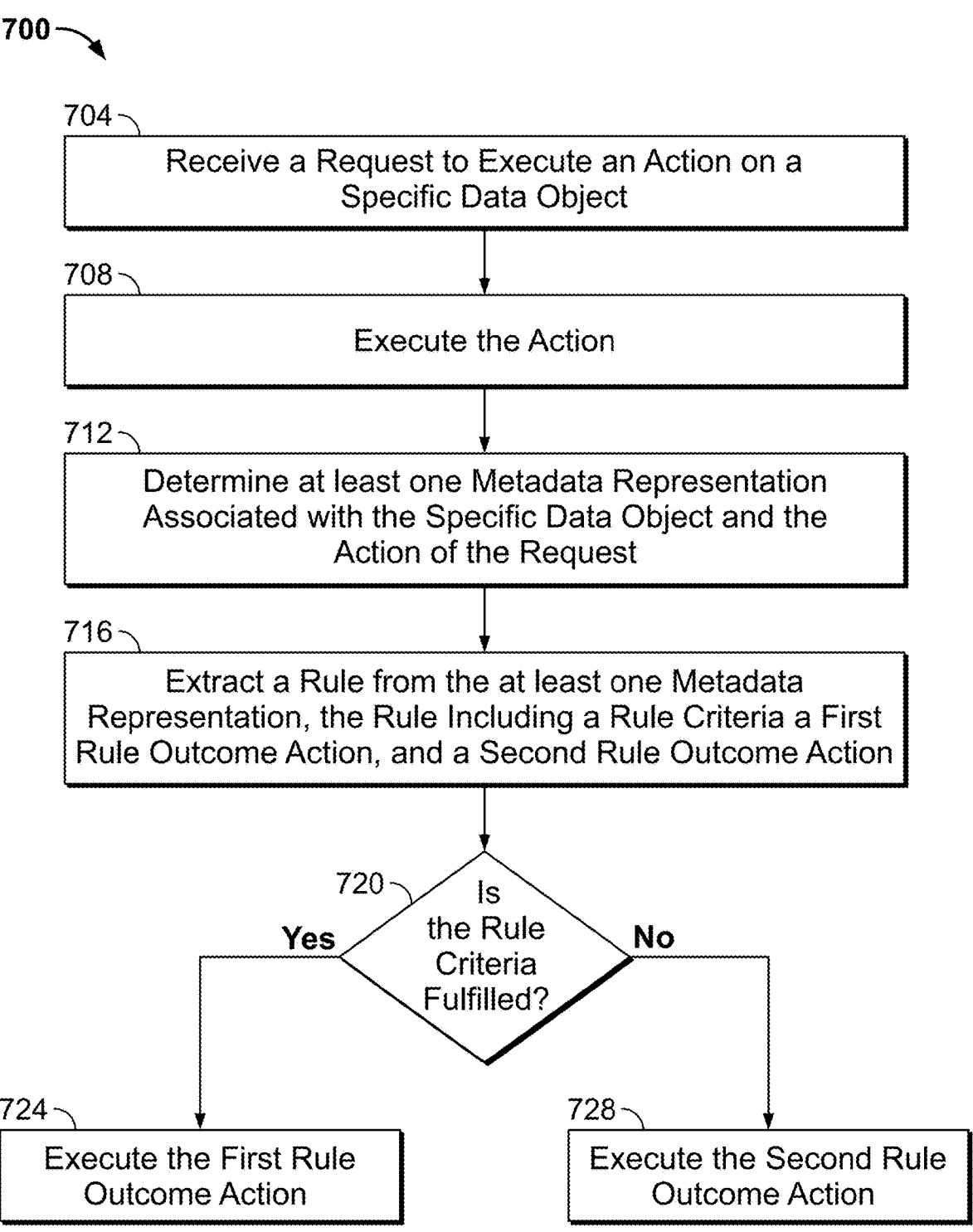
FIG. 7 is a flow diagram of a method for executing a rule extracted from a metadata representation, according to an example embodiment.

Referring now to FIG. 7, a method 700 of executing a rule extracted from a metadata representation is shown, according to an example embodiment. While different overall, it should be understood that any steps or discussion of the method 700 may be applied or included within the methods 600 and vice versa, and that such combinations are included within the scope of the present disclosure. For example, content management server 112 may perform the method 700 to receive the rule and generate a metadata representation associated with the specific rule, and then perform the method 700 to extract the rule from the metadata, at runtime, and execute the rule. Accordingly, method 700 can be carried out by the system of FIG. 1. More particularly, the method 700 can be carried out by the content management server 112.

Method 700 commences at step 704 at which the content management server 112 receives a request to execute an action on a specific data object. In some embodiments, the request may be received from one of the client computing devices 120*a-n*. Further, the action may include creating a data record based on the data object (i.e., instantiating the data object), deleting a data record which is an instantiated version of the data object, and/or modifying a data record which is an instantiated version of the data object. In some embodiments, additional actions may be included such as generating a new data object (e.g., a child data object, an inherited data object, etc.) based on the specific data object and/or specific modifications/updates (e.g., a state change, a specific field or value being set as a specific field or value, etc.) that may be made to the data record which is an instantiated version of the data object.

Once the content management server 112 has received the request, the content management server 112 may proceed to step 708 at which the content management server 112 executes the action of the request. For instance, at step 708, the content management server 112 may create the data record, update the data record, or delete the data record. In some embodiments, the content management server 112 may perform other actions described herein (e.g., generate a second data object, etc.). In some embodiments, step 708 and executing the action may be performed at the end of the method 700 (e.g., after step 724). In other embodiments, step 708 and executing the action may be performed dynamically in the method 700 (e.g., before step 712 or after step 724) based on the specific action type and/or the specific data object of the request. For instance, in response to the action being a create action, the content management server 112 may execute the action (create the record) before step 712 because the data record may be needed for the rule outcome action described further herein. In comparison, in response to the action being a delete action, the content management server 112 may execute the action (delete the record) after step 724 because the data record may be needed for the rule outcome action described further herein. In comparison, in response to the action being a modify/update action, the request may specify the order in which the content management server 112 is to execute the action (modify the record) (e.g., before step 712 or after step 724).

In some embodiments, the content management server 112 may receive a first ruleset including a rule which is to be evaluated prior to the action is executed and a second ruleset including a rule which is to evaluated after the action is executed. For instance, the content management server 112 may receive a first rule including a first rule criteria and a first rule outcome action and a second rule including a second rule criteria and a second rule outcome action. Accordingly, the content management server 112 may generate a first metadata representation including the first rule and a second metadata representation including the second rule. Then, prior to executing the action, the content management server 112 may extract the first rule (based on the first rule being specified as taking place prior to the action) and evaluate the rule. If the first rule criteria is satisfied, the content management server 112 may execute the first rule outcome action. The content management server 112 may then execute the action. Then, after executing the action, the content management server 112 may extract the second rule from the second metadata representation and evaluate the rule. If the second rule criteria is satisfied, the content management server 112 may execute the second rule outcome action.

By providing for dynamic evaluation and execution of the rules in relation to the trigger action, the present systems and methods provide for an improved rule handling and execution, and thereby provide a technical improvement to rule-based programming. For instance, by allowing the user to specify when the rule is to be evaluated and executed, the present systems and methods allow for the system to perform the action at a precise time and modify data when needed. For instance, if the action is a delete action, the user may specify a rule, that executes prior to the delete action, in which portions of the data object are stored for later evaluation or use in other systems. In comparison, if the action is an update action, the user may specify a rule, that executes after the update action, that sends out a notification that a specific data object or field thereof was updated. Accordingly, by providing for dynamic execution of the rules, the present systems and methods provide for rules that execute when they are needed to, thereby providing greater precision, efficiency, flexibility, and control in rule-based programming. For instance, by executing rules only when triggered by a specific action, the system avoids unnecessary rule evaluations. This leads to more efficient resource utilization and improved performance.

Once the content management server 112 executes the action, the method 700 proceeds to step 712 at which the content management server 112 determines at least one metadata representation associated with the specific data object. For instance, the content management server 112 may determine/select the second data object of the method 600, in response to the request identifying the specific data object (e.g., the first data object of the method 600). In that regard, the content management server 112 may determine/select each metadata representation associated with the specific data object and the specific action of the request. For instance, as described with regard to the method 600, the content management server 112 may generate a child data object for each specific data object and for each specific action. In that regard, in response to the specific data object being case dataset, and the specific action being removed, the content management server 112 may determine the child data object associated with the case dataset data object and the remove action. Then, the content management server 112 may select or determine the metadata representation(s) included in the child data object.

In some embodiments, at step 712, the content management server 112 may select/determine multiple metadata representations. For instance, the child data object described herein may include multiple data object representations (e.g., one for each rule of the ruleset). Accordingly, at step 712, the content management server may determine/select each metadata representation associated with the specific data object and the specific action of the request.

Once the content management server 112 has determined the metadata representation(s) associated with the specific data object and specific action of the request, the method 700 proceeds to step 716 at which the content management server 112 extracts a rule from one of the metadata representations. Each rule (also referred to as an event) may include a rule criteria and a rule outcome action. In some embodiments, the rule may be tenant code which is executable by the content management server 112 to evaluate the rule criteria and execute the rule outcome action. For instance, the content management server 112 may extract executable tenant code form the metadata representations to then execute the tenant code at runtime. In some embodiments, the tenant code may be registered at the tenant code registry (not shown).

The rule criteria may include an expression including specific data fields that indicate the rule is fulfilled. For instance, the rule criteria may include a specific field of the specific data object of the request (e.g., response date, country, etc.) and an expression including the specific field(s) which may be evaluated to true or false. For instance, FIG. 9B shows an example rule criteria including the expression ("response_date_c>"08/15/2024" && country_v=="USA"). Accordingly, to determine if the rule criteria is fulfilled, the content management server 112 may select the specific fields and evaluate them in the expression. In the example above, the rule criteria is fulfilled in response to the response date being greater than (i.e., after) 8/15/2024 AND the country field being USA. If the response date is before 8/15/2024 OR the country field is another country, the content management server 112 may determine the rule criteria is not fulfilled.

Likewise, the rule outcome action may be a specific function or action the content management server 112 takes in response to the rule criteria being fulfilled. In this regard, the rule outcome actions may be different than the actions of the request, which may be CRUD-like commands (e.g., create, update, and delete). For instance the rule outcome action may include a full set of functions and data modification actions such as setting a specific field of a data record, adding a specific field to a data record, creating a new data record, generating and sending a notification to a specific user, changing the workflow record (e.g., from a first state to a second state or a third state, etc.), and the like. FIG. 9C show some example rule outcome actions in an action menu 950.

In some embodiments, each rule may include multiple rule outcome actions including a first rule outcome action (also referred to as a rule fulfilled outcome action) and a second rule outcome action (also referred to as a rule failure outcome action). The first rule outcome action may be executed in response to the content management server 112 determining the rule criteria is fulfilled (as represented by the THEN statement 942). In comparison, the second rule outcome action may be executed in response to the content management server 112 determining the rule criteria is not fulfilled (as represented by the ELSE statement 944). In some embodiments, the second rule outcome action may be optional. For instance, some rules may include a single rule outcome action (e.g., a rule outcome action to execute in response to the rule criteria being fulfilled) and some rules may include two rule outcome actions (e.g., a rule outcome action to execute in response to the rule criteria being fulfilled and a rule outcome action to execute in response to the rule criteria not being fulfilled).

Once the content management server 112 has extracted the rule, the method 700 proceeds to step 720 at which the content management server 112 determines if the rule criteria is fulfilled. For instance, each rule criteria may include an expression including multiple data record fields. Accordingly, the content management server 112 may select the fields and evaluate the expression to true or false. If the expression evaluates to true, the content management server 112 may determine the rule criteria is fulfilled, and the method 700 may proceed to step 724 at which the content management server 112 executes the rule outcome action (e.g., the first rule outcome action). In comparison, if the expression evaluates to false, the content management server 112 may determine the rule criteria is not fulfilled, and the method 700 may end (in instances where the rule only includes a single rule outcome action) or the method 700 may proceed to step 728 where the content management server 112 executes the second rule outcome action.

As described herein, the content management server 112 may determine/select multiple metadata representations at step 712. Accordingly, the method 700 may proceed through steps 716-728 for each metadata representation. For instance, at step 712, the content management server 112 may determine four metadata representations each associated with a specific rule. Accordingly, the content management server 112 may proceed through steps 716-728 for each metadata representation. In some embodiments, each rule may further include a rank or order. Accordingly, the content management server 112 may first proceed through steps 716-728 with the highest-ranking rule, followed by the second highest ranking rule, and so on.

In an illustrative example, the content management server 112 may select three metadata representations at step 712: a first metadata representation associated with a first rule including the highest ranking (but lowest actual value) (e.g., 1), a first rule criteria, a first rule outcome action, a second metadata representation associated with a second rule including the second highest ranking (e.g., 2), a second rule criteria, a second rule outcome action, and a third rule outcome action, and a third metadata representation associated with a third rule including the lowest ranking (but highest actual value) of the three (e.g., 3), a third rule criteria, and a fourth rule outcome action. Accordingly, the content management server 112 may extract the first rule at step 716. Then, at step 720, the content management server 112 may determine the first rule criteria is not fulfilled, and because the rule only includes a single rule outcome action, proceed back to step 716 where the content management server 112 may extract the second rule. At step 720, the content management server 112 may determine the second rule criteria is not fulfilled and proceed to step 728 to execute the third rule outcome action (because the second rule includes multiple rule outcome actions). Then, the content management server 112 may proceed back to step 716 to extract the third rule. At step 720, the content management server 112 may determine the third rule criteria is fulfilled. In response, the content management server 112 may proceed to step 724 and execute the fourth rule outcome action. In this regard, the content management server 112 may extract and execute the rules based on their respective rank/order.

Figure 8:
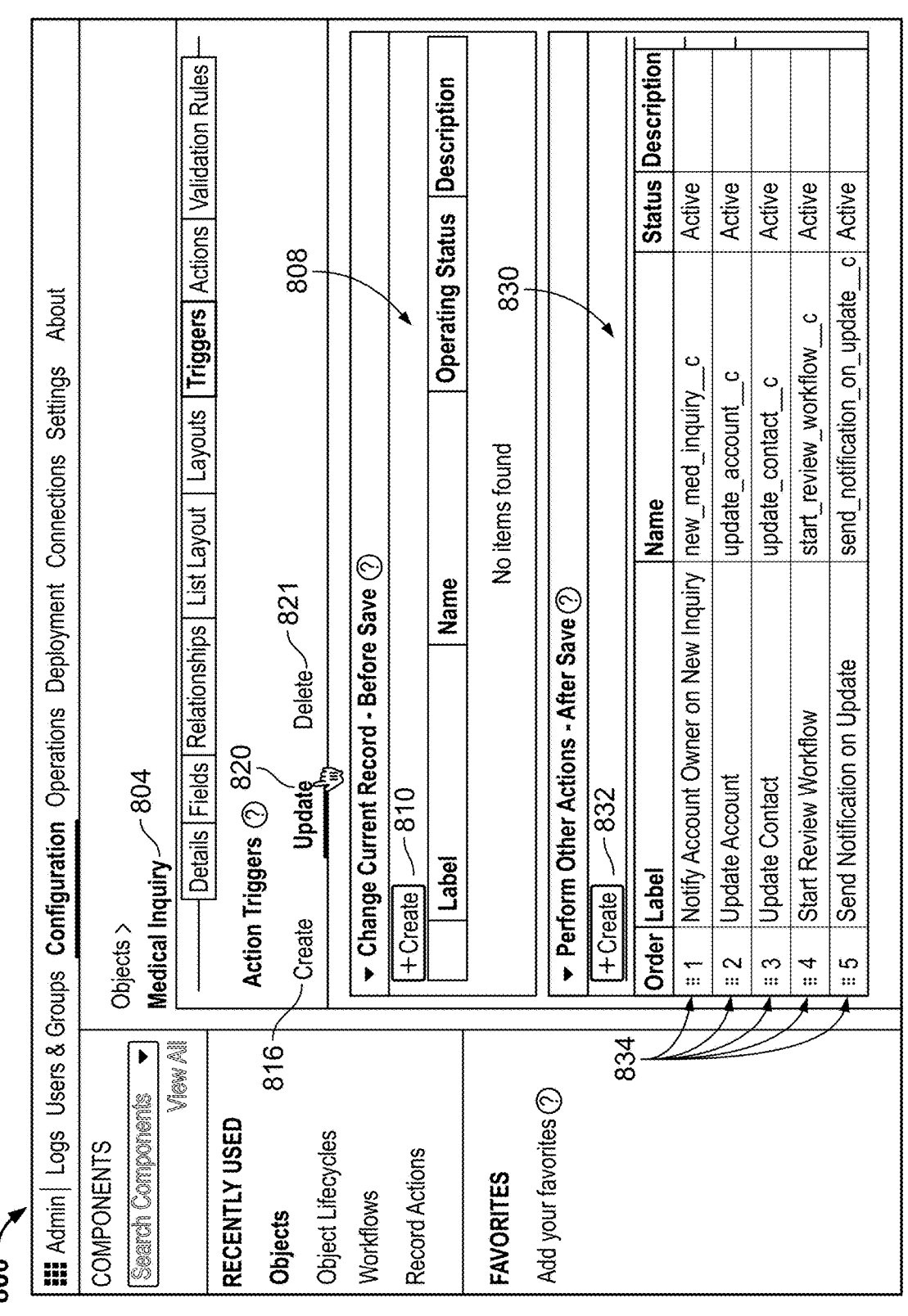
FIG. 8 is an illustration of a user interface displayed by the enterprise content management architecture of FIG. 1 to manage a ruleset.

Referring now to FIGS. 8-10, user interfaces shown and displayed to the user of the one or more client computing devices 120*a-n* during the methods 600 and/or 700 are shown, according to example embodiments. As described herein, the user interfaces of FIGS. 8-10 may be one or more of web interfaces generated by the content management system and rendered by each of the client computing devices 120*a-n* as part of a web application or graphical user interfaces downloaded and generated by each of the client computing devices 120*a-n* as part of a software application (e.g., a mobile application, etc.). Further, the user interfaces shown on FIGS. 8-10 allow for communication between the user) and the content management system 110 via the respective client computing device (e.g., 120*a*) (specifically via the input and output devices (e.g., 303 and 304), respectfully). Through interaction with the various user interfaces, the user may provide user input, feedback, and other data requested by the content management system 110. In this regard, it should be understood that each interaction described herein by the user with the user interfaces of FIGS. 8-10 may be provided to one or more of the client computing devices 120*a-n* and then transmitted to the content management system 110 and that each action described herein as occurring to the respective client computing device 120*a-n* (e.g., navigating to a certain page, generating a popup, etc.) may be performed by the content management system 110.

Referring now to FIG. 8, a ruleset page 800 which can be displayed on a display of one of the client computing devices 120*a-n*, is shown. In general, the ruleset page 800 provides the user an interface to create, view, and manage the specific rules of a ruleset. As shown, the ruleset page 800 includes a data object header or field 804, a first action button 816, a second action button 820, a third action button 821, a first (also referred to as before action) ruleset section 808, and a second (also referred to as an after action) ruleset section 830. To render or generate the ruleset page 800 on the client computing device (e.g., 120*a*), the content management system 110 (and more specifically the content management server 112) may provide the specific ruleset and/or metadata representations to the client computing device (e.g., 120*a*). In some embodiments, the content management system 110 may provide an empty ruleset/rule to the client computing device to render or generate the ruleset page 800 on the client computing device. For instance, the rule may include each of the fields and/or records of the rule but no values therein. In other embodiments, the empty rule may include filler/template fields (e.g., null, "Title" for a title field, "Name" for a name field, etc.).

The data object header or field 804 may be a text field that includes or identifies the data object associated with the rulesets of the first ruleset section 808 and the second ruleset section 830. For instance, the rules specified in the first ruleset section 808 and the second ruleset section 830 may be associated with or executed in response to the data object of the data object header 804 experiencing the specific action specified in the selected action button (e.g., the second action button 820 in FIG. 8).

In that regard, the action buttons 816-821 may each be selectable buttons to navigate to the ruleset(s) for the specific action of the button and the data object of the data object header 804. For instance, in FIG. 8, the second action button 820 (e.g., the update button 820) is selected. Accordingly, the rules of the ruleset sections 808 and 830 may be executed in response to the content management server 112 receiving a request to perform the update action on a medical inquiry data object (as indicated by the data object header

804). In comparison, if the first action button 816 (e.g., the create button 816) was selected, the rules of the ruleset sections 808 and 830 may be executed in response to the content management server 112 receiving a request to perform the create action on a medical inquiry data object (as indicated by the data object header 804).

As shown, the ruleset page 800 includes two ruleset sections including the first ruleset section 808 and the second ruleset section 830. The first ruleset section 808 may provide the user of the client computing device (e.g., 120*a*) with an interface to create, manage, and view rules which are evaluated or executed prior to the action of the request being performed or executed (e.g., step 708 of the method 700). In comparison, the second ruleset section 830 may provide the user of the client computing device (e.g., 120*a*) with an interface to create, manage, and view rules which are evaluated or executed after the action of the request is performed (e.g., step 708 of the method 700).

In that regard, the first ruleset section 808 may include a create button 810 and one or more rule representations (not shown, but may be similar or the same as rule representations 834). The create button 810 may be a selectable button that, when selected, causes the client computing device (e.g., 120*a*) to generate a rule representation. The rule representation may then receive the rule criteria and rule outcome action(s), which may be provided to the content management server 112 for generation as a metadata representation.

Similarly, the second ruleset section 830 may include a create button 832 and one or more rule representations 834. The create button 832 may be a selectable button that, when selected, causes the client computing device (e.g., 120*a*) to generate a rule representation 832. The rule representation 832 may then receive the rule criteria and rule outcome action(s), which may be provided to the content management server 112 for generation as a metadata representation.

Figure 9A:
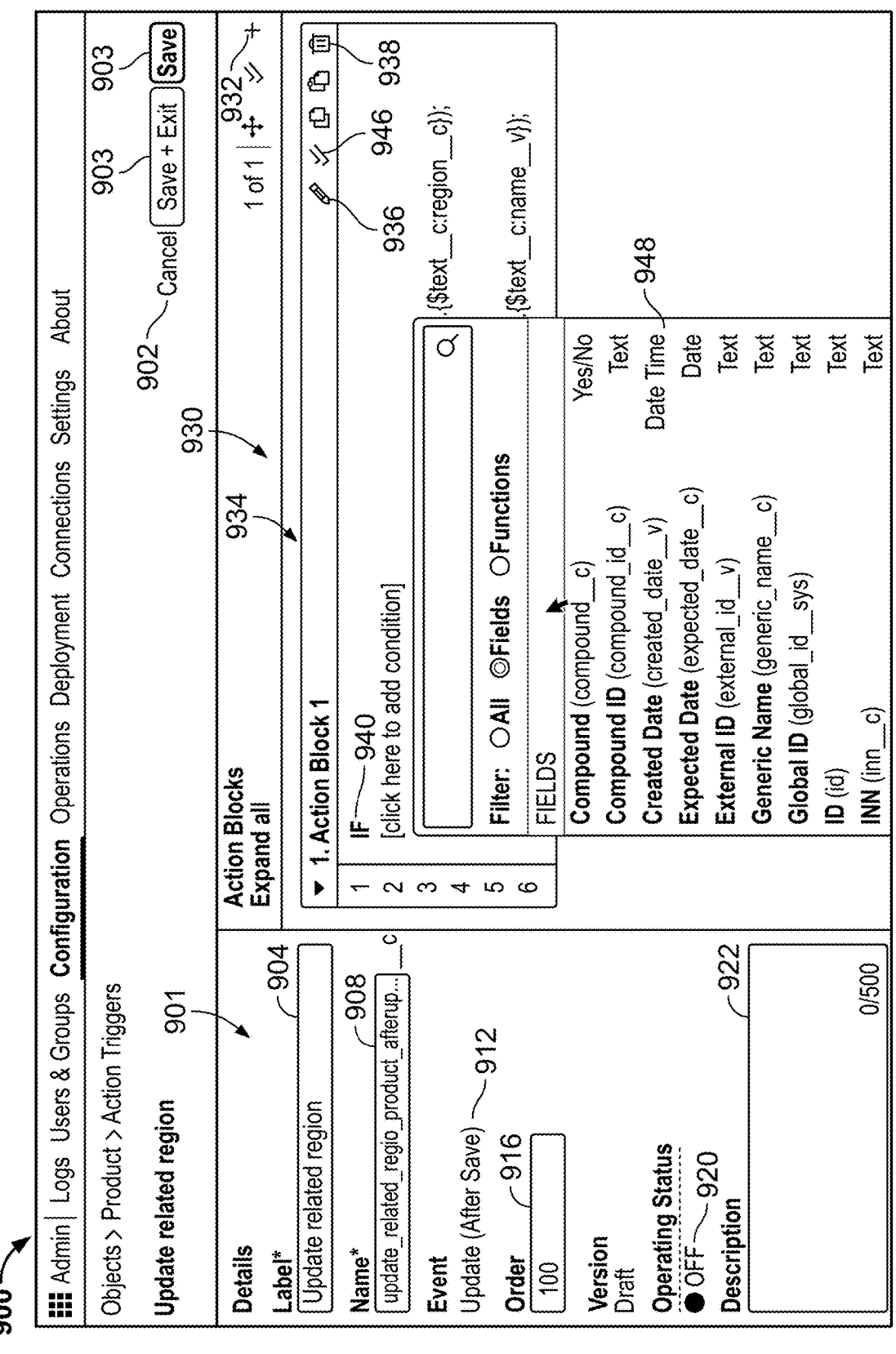
FIGS. 9A-9C are illustrations of a user interface displayed by the enterprise content management architecture of FIG. 1 to manage a rule of a ruleset.
Figure 9B:
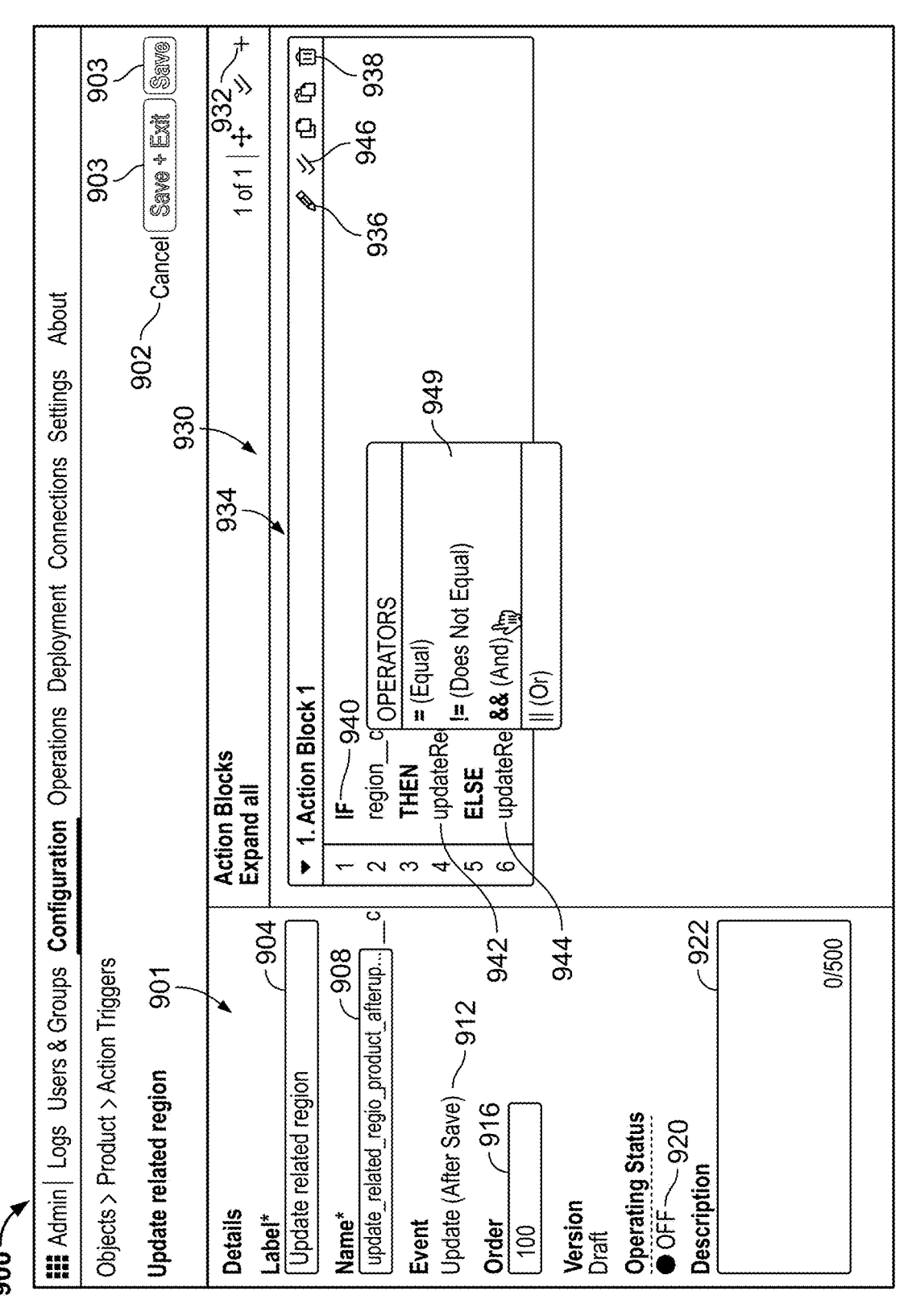
Figure 9C:
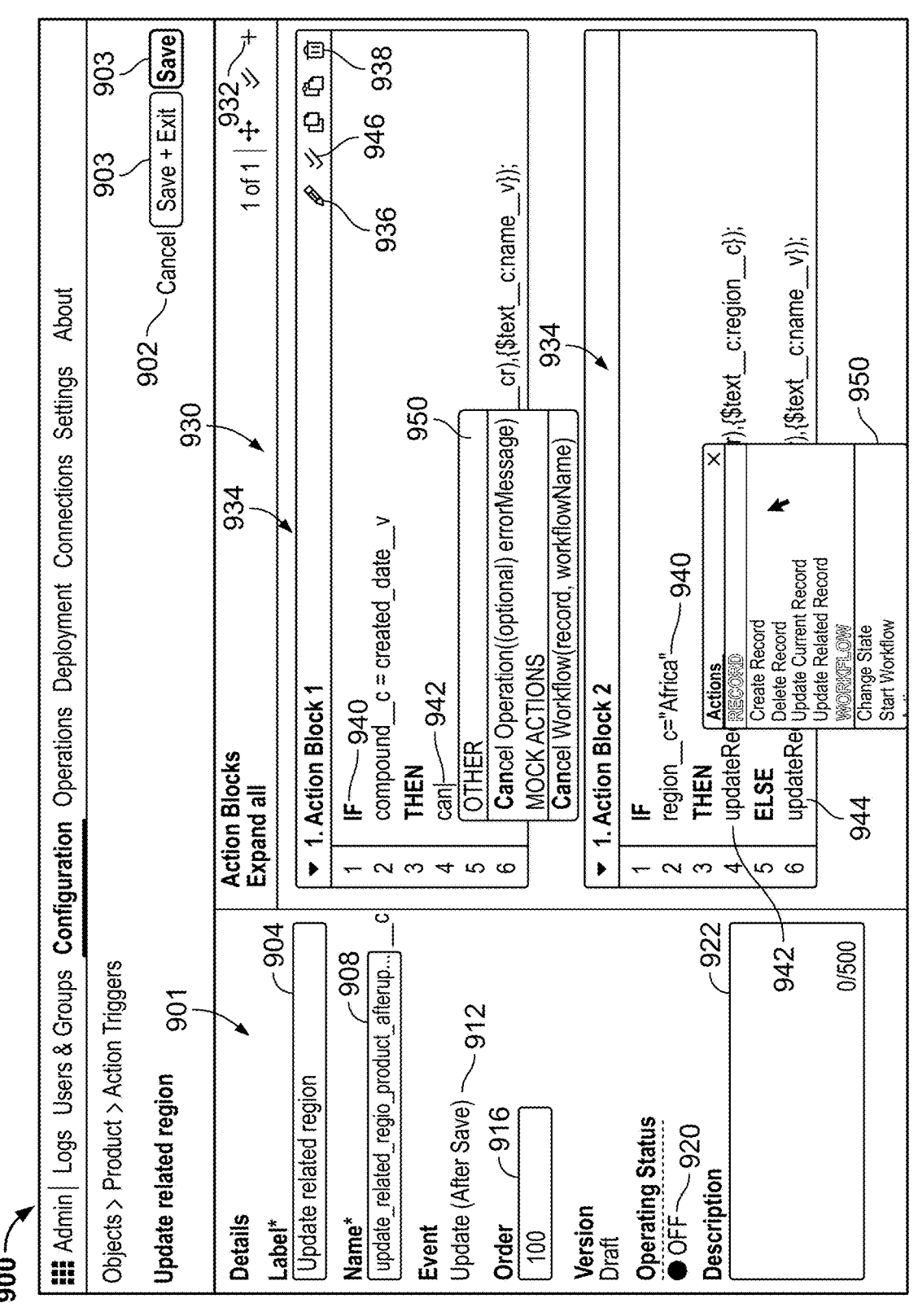

Referring now to FIGS. 9A-9C, a rule page 900 which can be displayed on a display of one of the client computing devices 120*a-n*, is shown. In general, the rule page 900 provides the user an interface to set, view, and manage a specific rule of a ruleset. In some embodiments, the rule page 900 may provide an interface to set, view, and manage multiple cascading rules of a ruleset. As shown, the rule page 900 includes a details section 901, a cancel button 902, one or more save buttons 903, and an action listing (also referred to as a rule management) section 930. To render or generate the rule page 900 on the client computing device (e.g., 120*a*), the content management system 110 may provide the rule including the rule criteria and the rule outcome action(s) to the client computing device (e.g., 120*a*). The cancel button 902 may be a selectable button to discard or delete any changes made to the rule of the rule page 900. In comparison, the save buttons 903 may each be selectable buttons that cause the client computing device (e.g., 120*a*) to provide the rule of the rule page 900 to the content management system 110 (e.g., the content management server 112) for storage therein as a metadata representation. In some embodiments, only rules that include a status of active are generated as metadata representations.

The details section 901 may include general details pertaining to the rule of the rule page 900. As shown, the details section 901 includes a label field 904, a name field 908, an event or action field 912, an order field 916, a status field 920, and a description field 922. The label field 904 and the description field 922 may each be text fields that include general descriptions of the rule of the rule page 900. In that regard, the label may be a short description and the description may be a longer description/summary.

The name field 908 may be a text field including the object record name which defines the rule of the rule page 900. For instance, the name of the name field 908 may be utilized in tenant code and metadata representations to call and execute the rule during runtime (e.g., see the name in the MDL file 1000. Likewise, the event field 912 may be a text field including the action which defines when the rule is evaluated/executed as well as the timing of the rule (e.g., before the action, after the action, etc.). For instance, the event field 912 of FIG. 9A includes the action Update (After Save). Accordingly, the rule of the rule page 900 may be evaluated after an update action is performed.

The order field 916 may be a text or number field including the order in which the rule of the rule page 900 executes in the rule set. For instance, the ruleset may include up to 500 rules. Accordingly, as the order field 916 includes the number 100, indicating the rule is evaluated after 99 other rules are evaluated (e.g., $100^{th}$ in order). In this regard, the first rule to be evaluated includes the highest or first order (e.g., 1), and the last rule to be evaluated includes the lowest or last order (e.g., 500).

The status field 920 may be a picklist field that includes multiple options for the status of the rule of the rule page 900. For instance, the status field 920 may be set to inactive, active, and/or currently inactive (indicating that a specific event (e.g., a specific date, specific set of values, a specific time or time period) activates the rule. Accordingly, when a rule is inactive, the rule may not be evaluated during runtime. In comparison, when a rule is active, the rule may be evaluated during runtime.

The action listing (also referred to as a rule management) section 930 provide the user of the client computing device (e.g., 120a) an interface to create and manage the rule including the rule criteria and the one or more rule outcome actions. As shown, the action listing section 930 includes a create or add button 932 and one or more actions blocks (also referred to as rule representations) 934. The add or create button 932 is a selectable button that, when selected, causes the client computing device (e.g., 120a) to generate and display an empty action block 934 on the action listing 930.

Each action block or rule representation 934 defines the specific rule criteria and the rule outcome action(s) using an if/then/else syntax. In that regard, each rule includes an IF statement 940, a THEN statement 942, and an ELSE statement 944. The IF statement 940 may be a text block that defines the rule criteria using evaluable expressions. For instance, the user of the client computing device (e.g., 120a) may provide an expression in the IF statement 940 that can be evaluated to true or false (e.g., "field 1==5"). Accordingly, the content management server 112 may receive the rule including the IF statement 940, generated MDL including the IF statement 940, and evaluate the IF statement 940 at runtime. If the IF statement 940 evaluates to true, the content management server 112 may determine the rule criteria is fulfilled and perform the rule outcome action of the THEN statement 942. If the IF statement 940 evaluates to false, the content management server 112 may determine the rule criteria is not fulfilled and perform the rule outcome of the ELSE statement 944.

In that regard, the THEN statement 942 and the ELSE statement 944 may each be a text block that defines rule outcome action(s) of the rule of the rule page 900. For instance, the user of the client computing device (e.g., 120a) may provide an executable action statement to the THEN statement 942 and the ELSE statement 944."). Accordingly, the content management server 112 may receive the rule including the THEN statement 942 and the ELSE statement 944, generated MDL including the THEN statement 942 and the ELSE statement 944, evaluate the IF statement 940 at runtime, and execute the action of either the THEN statement 942 or the ELSE statement 944.

Each action block (also referred to as rules or rule representations) 934 may provide for click through generation of the IF/THEN/ELSE statements 940-944, in addition to typing generation. For instance, FIG. 9A shows an example of selecting (e.g., via the click of a computer mouse) the IF statement 940 for the first time, which may result in the overlay and display of the field and functions option menu 948. The field and functions option menu 948 displays multiple field and function options, which may be selected for addition to the IF statement 940. For instance, in response to a selection of the field Compound, the text "compound_c" may be added to the IF statement 940. Likewise, the fields of the field and functions option menu 948 may be fields of the data object associated with the rule of the rule page 900. For instance, the Compound field may be a field of the medical inquiry data object. In this regard, the content management server 112 may provide the fields of the data object of the rule to the client computing device (e.g., 120a) for display in the field and functions option menu 948. In some embodiments, the field and functions option menu 948 may be automatically set to the Fields filter, in response to the IF statement 940 being empty (because IF statements usually start with a field).

Once the user of the client computing device (e.g., 120a) has selected an initial field and/or function from the field and functions option menu 948, the operators option menu 949 may be automatically overlaid and displayed, and each operator may then be selected for addition to the IF statement 940. For instance, in response to a selection of the operator "=", the "=" may be added to the IF statement 940. Further, the operators option menu 949 may include operators that correspond to the field included in the IF statement 940. For instance, in response to the field being a numerical value, the operators option menu 949 may include the operators "=_" "!=" ">" ">=" "<" and "<=". In comparison, in response to the field being a string or text value, the operators option menu 949 may include the operators "=" "!=" "&&" "||" but not ">" because strings cannot be greater than one another. In this regard, the operators option menu 949 may be generated to include operators that correspond to the specific field included in the IF statement 940.

Then, once the user of the client computing device (e.g., 120a) has selected the operator from the operators option menu 949, the fields and functions option menu 948 may be automatically overlaid and displayed which may result in the overlay and display of the field and functions option menu 948 for selection of a field or function option menu, which may be added to the IF statement 940 to complete the IF statement 940.

In comparison, FIG. 9C shows an example if the user selects the THEN statement 942 or the ELSE statement 944, which may result in the overlay and display of the action options menu 950. The action options menu 950 displays multiple system defined actions, which may be selected for addition to the THEN statement 942 or the ELSE statement 944. For instance, in response to a selection of the action create record, the text "create_record( )" may be added to the corresponding statement. In some embodiments, the action may be automatically populated with the name of the data object associated with the rule. For instance, in response to a selection of the action create record, the text "create_record(medical_inquiry_v" may be added to the corresponding statement (because the medical inquiry data object is associated with the rule.

Because the present systems and methods provide for click through generation of the IF/THEN/ELSE statements 940-944 by utilizing option menus that are generated based on already entered values, the present systems and methods take a complicated experience that often requires a degree (e.g., programming) and create a rule generation system which requires little skill, thereby reducing errors and providing for improved rule generation. For instance, because the systems and methods described herein, generate menus including fields which correspond to the data object associated with the rules, the user can better determine and access the fields they may want to utilize when generating rules providing for less error in the rule-building process, and thereby saving on processing power and memory by requiring less iterations in rule development. Likewise, by displaying operators that correspond to the type of the field (e.g., number, string, etc.), the present systems and methods again provide for less error in the rule-building process, thereby saving on processing power and memory by requiring less validations (e.g., by not having validations come back with failed indications) overall.

Each action block 934 may further include an edit button 936, a delete button 938, and a validate button 946. The delete button 938 may be a selectable button that, when selected, causes the corresponding action block 934 to be deleted. Likewise, the edit button 936 may be a selectable button that, when selected, causes the corresponding action block 934 to become editable such that the IF/THEN/ELSE statements 940-944 may be modified by the client computing device (e.g., 120a).

The validate button 946 may be a selectable button that causes the client computing device (e.g., 120a) to output the rule of the action block 934 to the content management server 112, which may validate the rule as described with regard to step 608 of the method 600. In some embodiments, if the rule fails validation, the content management server 112 may provide an indication to the client computing device (e.g., 120a), which may display the indication on the rule page 900. In comparison, if the rule passes validation, the content management server 112 may provide an indication to the client computing device (e.g., 120a), which may display the indication on the rule page 900.

By providing for inline validation of the action block 934, the present systems and methods provide for a simpler, more accurate set of rules that can be corrected prior to being generated as MDL and executed. For instance, by offering inline validation, the present systems and methods offer real-time feedback to users as they input rule criteria and rule outcome actions, immediately highlighting errors or suggesting corrections. This proactive approach significantly enhances user experience, reduces errors, and improves efficiency. For instance, because of the inline validation of the action block 934, users can identify and correct syntax errors as they type, preventing them from proceeding with rules, which provides for improved rule quality and an enhanced graphical user interface.

Referring now to FIG. 10, an example metadata definition language (MDL) file 1000 (also referred to as a metadata representation), is shown. As shown, the MDL of the MDL File 1000 may be a part of a specific data object (e.g., the "new_inquriy_response_c" object). In that regard MDL may be similar to Data Definition Language (DDL) in databases, and provide runtime actions to create, describe (read), update, and drop (delete) components of one of the content repositories 111a-n make up its configuration. In that regard, MDL is a tool for manipulating data records programmatically. For instance, MDL uses CRUD-like commands to manage data records of the content management system 110. Based on MDL commands, the content management system 112 may use CREATE, RECREATE, RENAME, ALTER, and DROP commands to manage data records of the content management system 110.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for generating a metadata representation and storing the metadata representation in a repository, the method comprising:

receiving, by a content management server, a first rule associated with a data object and including a trigger action, a rule criteria, a first rule outcome action associated with the rule criteria being fulfilled, and a second rule outcome action associated with the rule criteria not being fulfilled;

generating, by the content management server, the metadata representation based on the first rule;

storing, by the content management server, the metadata representation in the repository;

receiving, by the content management server, a request to execute an action on the data object, wherein the action is a create action;

selecting, by the content management server and in response to the trigger action matching the action of the request, the metadata representation from the first repository;

extracting, by the content management server, the rule from the metadata representation;

executing, by the content management server, the action on the data object to instantiate a data record based on the data object;

determining, by the content management server, the rule criteria is fulfilled; and executing, by the content management server and in response to the rule criteria being fulfilled, the first rule outcome action.

2. The method of claim 1, wherein the rule criteria is a first rule criteria, and wherein the method further comprises:

receiving, by the content management server, a second rule associated with the data object and including the trigger action, a second rule criteria, and a third rule outcome action, wherein the metadata representation is generated based on the first rule and the second rule;

extracting, by the content management server, the second rule from the metadata representation;

determining, by the content management server, the second rule criteria is fulfilled; and executing, by the content management server and in response to the second rule criteria being fulfilled, the third rule outcome action, wherein the action is executed on the data object after the third rule outcome action is executed.

3. The method of claim 1, wherein the rule criteria is a first rule criteria, and wherein the first rule includes a first ranking, and wherein the method further comprises:

receiving, by the content management server, a second rule associated with the data object and including the trigger action, a second rule criteria, a third rule outcome action, and a second ranking, wherein the metadata representation is generated based on the first rule and the second rule;

extracting, by the content management server, the second rule from the metadata representation;

determining, by the content management server, the second rule criteria is fulfilled; and executing, by the content management server and in response to the second rule criteria being fulfilled, the third rule outcome action, wherein the first rule outcome action is executed before the third rule outcome action based on the first ranking being a higher rank than the second ranking.

4. The method of claim 1, further comprising:

outputting, by the content management server, an empty rule to a client computing device to enable display on a user interface comprising:

a rule representation including an IF statement field, a THEN statement field, and an ELSE statement field, wherein the rule criteria is received via the IF statement field, wherein the first rule outcome action associated with the rule criteria being fulfilled is received via the THEN statement field, and wherein the second rule outcome action associated with the rule criteria not being fulfilled is received via the ELSE statement field.

5. The method of claim 4, wherein the data object includes at least one data field, and wherein in response to a selection of the IF statement field, the user interface includes an option menu including the at least one data field of the data object.

6. The method of claim 1, wherein the data object is a first data object, and wherein the method further comprises:

generating, by the content management server, a second data object depending from the first data object and including the metadata representation, wherein the second data object is stored in the repository.

7. The method of claim 1, wherein the metadata representation is a metadata definition language (MDL) that includes at least one of a: a create command, a recreate command, a rename command, an alter command, or a drop command.

8. A content management system for generating and storing a metadata representation, comprising:

a repository; and a content management server configured to:

receive a first rule associated with a data object and including a trigger action, a rule criteria, a first rule outcome action associated with the rule criteria being fulfilled, and a second rule outcome action associated with the rule criteria not being fulfilled;

generate the metadata representation based on the first rule;

store the metadata representation in the repository;

receive a request to execute an action on the data object, wherein the action is a create action;

select, in response to the trigger action matching the action of the request, the metadata representation from the first repository extract the rule from the metadata representation;

execute the action on the data object to instantiate a data record based on the data object;

determine the rule criteria is not fulfilled; and execute, in response to the rule criteria not being fulfilled, the second rule outcome action.

9. The content management system of claim 8, wherein the rule criteria is a first rule criteria, and wherein the content management server is further configured to:

receive a second rule associated with the data object and including the trigger action, a second rule criteria, and a third rule outcome action, wherein the metadata representation is generated based on the first rule and the second rule;

extract the second rule from the metadata representation;

determine the second rule criteria is fulfilled; and execute, in response to the second rule criteria being fulfilled, the third rule outcome action, wherein the action is executed on the data object after the third rule outcome action is executed.

10. The content management system of claim 8, wherein the rule criteria is a first rule criteria, and wherein the first rule includes a first ranking, and wherein the content management server is further configured to:

receive a second rule associated with the data object and including the trigger action, a second rule criteria, a third rule outcome action, and a second ranking, wherein the metadata representation is generated based on the first rule and the second rule;

extract the second rule from the metadata representation;

determine the second rule criteria is fulfilled; and execute, in response to the second rule criteria being fulfilled, the third rule outcome action, wherein the second rule outcome action is executed before the third rule outcome action based on the first ranking being a higher rank than the second ranking.

11. The content management system of claim 8, wherein the content management server is further configured to:

output an empty rule to a client computing device to enable display on a user interface comprising:

a rule representation including an IF statement field, a THEN statement field, and an ELSE statement field, wherein the rule criteria is received via the IF statement field, wherein the first rule outcome action associated with the rule criteria being fulfilled is received via the THEN statement field, and wherein the second rule outcome action associated with the rule criteria not being fulfilled is received via the ELSE statement field.

12. The content management system of claim 11, wherein the data object includes at least one data field, and wherein in response to a selection of the IF statement field, the user interface includes an option menu including the at least one data field of the data object.

13. The content management system of claim 8, wherein the data object is a first data object, and wherein the content management server is further configured to:

generate a second data object depending from the first data object and including the metadata representation, wherein the second data object is stored in the repository.

14. The content management system of claim 8, wherein the metadata representation is a metadata definition language (MDL) that includes at least one of a: a create command, a recreate command, a rename command, an alter command, or a drop command.

15. A method for generating at least one metadata representation and storing the at least one metadata representation in a repository, the method comprising:

receiving, by a content management server, a first rule associated with a data object and including a trigger action, a first rule criteria, and a first rule outcome action;

receiving, by the content management server, a second rule associated with the data object and including the trigger action, a second rule criteria, and a second rule outcome action;

generating, by the content management server, the at least one metadata representation based on at least one of the first rule or the second rule;

storing, by the content management server, the at least one metadata representation in the repository;

receiving, by the content management server, a request to execute an action on the data object, wherein the action is a create action;

selecting, by the content management server and in response to the trigger action matching the action of the request, the at least one metadata representation from the first repository;

extracting, by the content management server, the first rule from the at least one metadata representation;

extracting, by the content management server, the second rule from the at least one metadata representation;

determining, by the content management server, the first rule criteria is fulfilled;

executing, by the content management server and in response to the first rule criteria being fulfilled, the first rule outcome action;

executing, by the content management server and after executing the first rule outcome action, the action on the data object to instantiate a data record based on the data object;

determining, by the content management server and in response to executing the action on the data object, the second rule criteria is fulfilled; and executing, by the content management server and in response to the second rule criteria being fulfilled, the second rule outcome action.

16. The method of claim 15, wherein the first rule outcome action is associated with the first rule criteria being fulfilled, and wherein the first rule includes a third rule outcome action associated with the first rule criteria not being fulfilled.

17. The method of claim 16, further comprising:

outputting, by the content management server, an empty first rule to a client computing device to enable display on a user interface comprising:

a rule representation including an IF statement field, a THEN statement field, and an ELSE statement field, wherein the first rule criteria is received via the IF statement field, wherein the first rule outcome action associated with the first rule criteria being fulfilled is received via the THEN statement field, and wherein the third rule outcome action associated with the first rule criteria not being fulfilled is received via the ELSE statement field.

18. The method of claim 17, wherein the data object includes at least one data field, and wherein in response to a selection of the IF statement field, the user interface includes an option menu including the at least one data field of the data object.

19. The method of claim 15, wherein the data object is a first data object, and wherein the method further comprises:

generating, by the content management server, a second data object depending from the first data object and including the metadata representation, wherein the second data object is stored in the repository.

20. The method of claim 15, wherein the metadata representation is a metadata definition language (MDL) that includes a: a create command, a recreate command, a rename command, an alter command, or a drop command.

\* \* \* \* \*